Dec. 12, 1967 F. M. SCHULTZ 3,358,129

ELECTRONIC TRIGONOMETRIC MULTIPLIER

Filed May 28, 1964 2 Sheets-Sheet 1

INVENTOR
FREDERICK M. SCHULTZ

BY Donald Brown

ATTORNEY

INVENTOR
FREDERICK M. SCHULTZ
BY Donald Brown
ATTORNEY 3,358,129

ELECTRONIC TRIGONOMETRIC MULTIPLIER

Frederick M. Schultz, Winchester, Mass., assignor to Raytheon Company, Lexington, Mass., a corporation of Delaware Filed May 28, 1964, Ser. No. 370,956
10 Claims. (Cl. 235—194)

ABSTRACT OF THE DISCLOSURE

A multiplier for producing an output signal equal to the product of Y and the trigonometric function X having a pulse width modulator for X, a pulse amplitude modulator for Y, and a band-pass filter for operating on the amplitude modulator output.

This invention pertains to multipliers and, more particularly, to a new and improved electronic multiplier or resolver for generating an output signal representative of the product of a first signal and a trigonometric function of a second signal.

Multipliers or resolvers providing the product of a variable Y and the trigonometric function of a variable X heretofore in use, primarily depended on electromechanical devices such as servomechanisms driving mechanical or electrical cams and potentiometers. A description of these prior art devices can be found in the text, "Electronic Analog Computers," by Korn and Korn, 2nd edition, 1956, and published by the McGraw-Hill Book, Inc. Further, prior art devices have included induction resolvers utilizing a driving servo.

The mechanical systems utilizing potentiometers have inherent disabilities, such as limitations in resolution, low reliability, moving parts and brush friction. Further, both the potentiometer and induction resolvers are restricted because of the limited response of the driving servomotor.

Prior art electronic devices utilized to provide the product of Y and the trigonometric function of X have almost exclusively relied upon diode function generators. The trigonometric function of a variable X is derived by means of a series of straight line approximations obtained by utilizing as many as 24 diode sections. The output from the diode function generator is then multiplied with a variable Y in a linear multiplier. Because of the number of diode elements, the diode function generator is extremely temperature sensitive. Further, the diode generator is of limited accuracy because of the manner in which the trigonometric function is generated.

Accordingly, it is a principal object of this invention to provide a new and improved multiplier.

It is an additional object of this invention to provide a new and improved electronic resolver or trigonometric multiplier.

In accordance with this invention, a multiplier, utilizing band-pass filtering techniques to extract a signal related to the product of a variable or constant Y and a function of a variable or constant X, is provided. In the preferred embodiment shown, a signal A of a frequency $f$ is pulse width or pulse duration modulated in accordance with a signal representing a variable X to provide as signal Z. This pulse width modulated signal Z is then pulse amplitude modulated in accordance with a signal representing a variable Y. To obtain an output signal equal to the product of Y and the trigonometric function X, the pulse width and amplitude modulated signal Z is then operated on by a band-pass filter tuned to the fundamental frequency $f$ or a multiple thereof.

Other objects and advantages of this invention will become more apparent from the following description and accompanying drawings forming part of this application.

Figure 1:
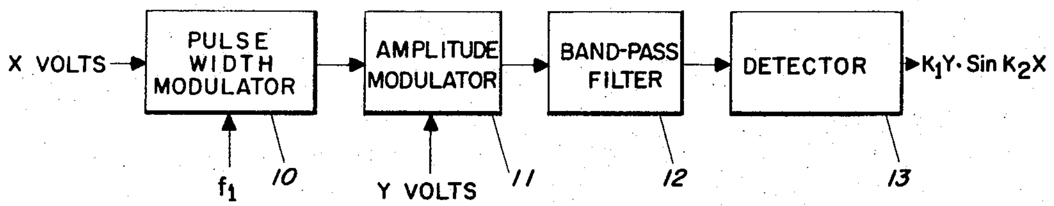
FIG. 1 is a block diagram of a multiplier in accordance with the invention.
Figure 3:
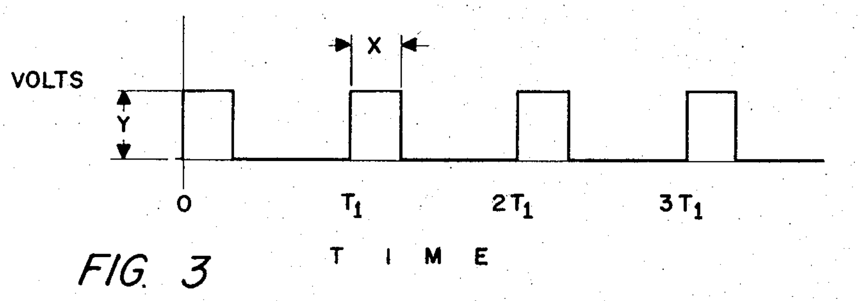
FIG. 3 is a waveform diagram illustrating a pulse train appearing at the output of the amplitude modulator of FIGS. 1 and 2.
Figure 2:
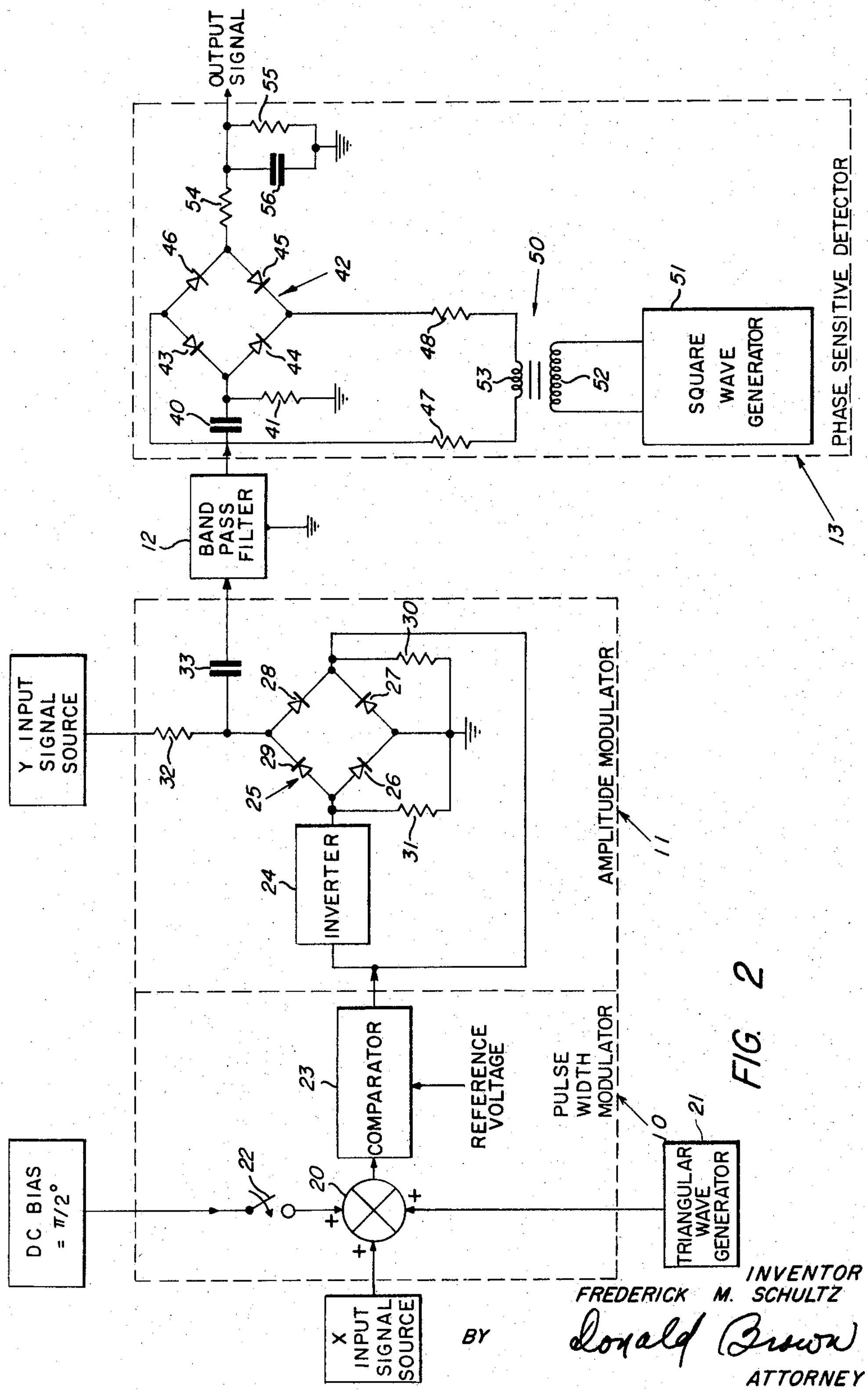
FIG. 2 is a partial schematic diagram of an implementation of the device in FIG. 1.

Referring now to the functional block diagram of FIG. 1 and the schematic drawing of FIG. 2, there is shown an electronic trigonometric multiplier providing an output signal related to the product of Y and sine X where both Y and X are input variable signals. For example, X could be an input voltage which corresponds to an angle $\theta$. In order to provide this output signal, the input signal voltage X is applied to a pulse width or pulse duration modulator 10. In the preferred embodiment, the pulse width modulator 10 comprises a summing device 20 to which the X input voltage is provided. Additionally, a triangular wave generator 21 simultaneously provides a triangular voltage of a period T and a frequency of $f_1$. The sum of these two signals are then provided to a comparator 23 to which there is applied a reference voltage. As the input voltage X varies, the sum of the triangular input waveform and the X input signal when compared with the reference signal applied to comparator 23, will produce an output waveform, such as shown in FIG. 3, wherein the width of the pulse will vary in accordance with the magnitude of the input voltage X. Thus, a pulse train of a period T and a frequency $f_1$ is provided having a pulse width X, where X depends upon the comparison between the sum of the input voltage X and the triangular waveform as compared to the reference signal applied to the comparator. Additionally, pulse width modulation could be provided by the pulse modulator called for in the United States Patent No. 2,872,109, issued in the name of Blanchard D. Smith, Jr. In this patent, Blanchard D. Smith states that his modulator may be a circuit of the phantastron type, such as described on pages 195 through 204, volume 19, "Radiation Laboratories Series," McGraw-Hill Book, Inc.

The output signal from the pulse width modulator 10 is then applied to an amplitude modulator or gate 11. In the preferred embodiment shown in FIG. 2, a portion of the input pulse waveform is inverted by inverter 24. The directly coupled signal and the signal from the inverter is then applied across a bridge circuit 25. The bridge circuit comprises four diodes 26, 27, 28 and 29 and two resistors 30 and 31 connected as shown in FIG. 2. The input signal Y is then applied across the two opposite terminals of the bridge circuit 25 through a resistor 32. In this manner, the voltage representing the Y input signal is applied to the bridge circuit 25 to amplitude-modulate the pulse train shown in FIG. 2. This amplitude-modulated pulse width modulator output signal is then coupled out through a coupling capacitor 33. Although the preferred embodiment shows a particular type of bridge modulator, other modulators well known in the art, could be utilized.

Figure 5:
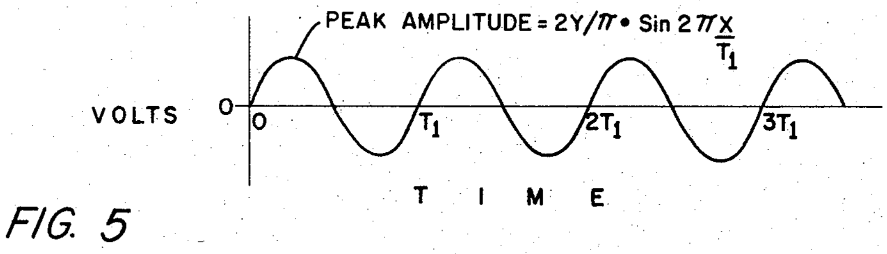
FIG. 5 is a waveform diagram illustrating the output signal provided by the band-pass filter of FIGS. 1 and 2.

The output signal from the amplitude modulator is then applied to a band-pass filter 12. The band-pass filter 12 is tuned to the frequency $f_1$, previously mentioned, or any multiple or harmonic thereof. Additionally, a band-pass filter, such as Model No. 310–AB, sold by Krohn-Hite Instrument Company of Cambridge, Mass., could be utilized. The band-pass filter may be constructed of sections of either the normal T or $\pi$ configuration circuits. In the preferred embodiment, it will be assumed that the band-pass filter 12 is tuned to the frequency $f_1$. The output signal from the band-pass filter 12 is shown in FIG. 5 wherein a signal is obtained which is related to the product of Y and sin X.

Figure 4:
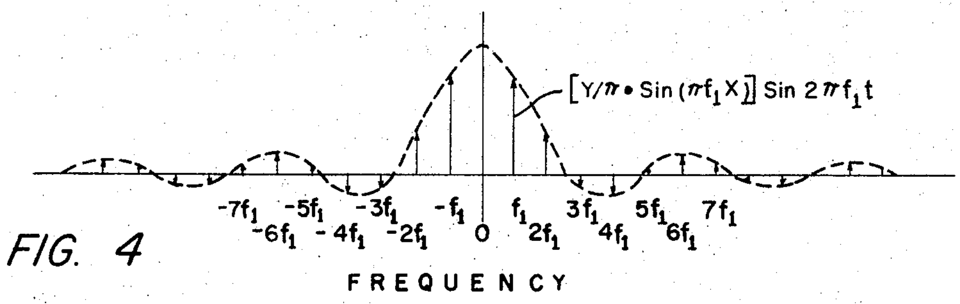
FIG. 4 is a fraquency domain representation of the pulse train of FIG. 3.

The theory of the operation of this device is as follows: the repetitive pulse, whose duration is proportional to a variable input voltage X, is generated by means of a linear time modulation device, such as the pulse width modulator 10. If this pulse is used to gate a second variable Y, the resulting pulse amplitude modulated-pulse duration modulated waveform, is as shown in FIG. 3. This is the output signal obtained from the amplitude modulator 11, shown in FIGS. 1 and 2. By performing Fourier transformation, the pulse train can be represented in the frequency domain, as shown in FIG. 4. As illustrated, the pulse train comprises a series of sinusoidal components at frequencies which are integral multiples of the fundamental pulse repetition frequency, $f_1$. The amplitude of the individual components is given by the expression $$\frac{XY}{T_1}\cdot\frac{\text{Sin }(\eta\pi f_1X)}{\eta\pi f_1X}$$

where $\eta=0, \pm1, 2, 3 \ldots$ and $f_1=1/T_1$ is the fundamental repetition frequency. This equation, representing the frequency domain of a repetitive pulse signal, can be obtained from the book, "Information Transmission Modulation and Noise" by Mischa Schwartz, McGraw-Hill Book, Inc., chapter 2, copyrighted in 1959. Furthermore, this equation can be obtained from the book, "Reference Data for Radio Engineers," 4th edition, published by the International Telephone and Telegraph Corporation and copyrighted in 1956; particularly on page 1019. Evaluating this expression for $\eta=\pm1$, the peak amplitude of the component $\pm f_1$ simplifies to the following:

$$\frac{2XY}{T_1}\cdot\frac{\text{Sin }(\pi X/T_1)}{\pi X/T_1}=\frac{2Y}{\pi}\cdot\text{Sin }\pi\ X/T_1$$

But this result is exactly of the form of the desired product, Y sin X. The complete mathematical expression for the sinusoidal component of frequency $\pm f_1$ is $$[2Y/\pi\cdot\sin\ \pi X/T_1]\ \sin\ (2\pi f_1t)$$

where the quantity in brackets is a constant and Sin $(2\pi f_1t)$ is a time varying sinusoidal wave of frequency $f_1$. The expression is illustrated graphically in FIG. 5. The factor 2 is obtained in the equation due to the fact that the components at $\pm f_1$ add algebraically in the process of filtering. The fundamental frequency, sinusoidal component of the pulse train, can be extracted by passing the pulse train through a band-pass filter tuned to the fundamental frequency $f_1$. The filter is followed by a detector, the output of which is the desired voltage, $$2Y/\pi\ \sin\ (\pi X/T_1)$$

The signal obtained from the band-pass filter could be utilized directly in many applications which require AC input signals. If desired, a DC output signal could be obtained, as shown in FIGS. 1 and 2, by utilizing a detector. The detector 13, shown in FIG. 1, may either be a peak detector wherein a positive output signal will always be obtained or a phase sensitive detector, such as shown in FIG. 2, could be utilized to provide both a positive and a negative going signal depending upon the sign of sin $\theta$. The phase sensitive detector, shown in FIG. 2, comprises an input capacitor 40 coupled to an input resistor 41. The output from the band-pass filter 12 is applied directly to the input capacitor 40. A bridge demodulator circuit is utilized, shown at 42, and comprises four diodes 43, 44, 45 and 46 connected as shown in FIG. 2. A square wave generator 51 is coupled through a transformer 50 having a primary winding 52 and a secondary winding 53 to the bridge circuit 42 by way of resistors 47 and 48. By applying this square wave signal from generator 51 across the terminals of the bridge 42 and applying the output of the band-pass filter 12 across the opposite terminals of the bridge 42, a DC output signal equal to $$\frac{2Y}{\pi}\sin\frac{\pi X}{T_1}$$

is obtained. This signal is applied to a load comprising resistor 55 and capacitor 56 through an output dropping resistor 53. In order for the detector to properly function as a phase sensitive detector, the frequency of the square wave generator 51 is adjusted such that it is equal to the frequency $f_1$ and period $T_1$ and of the same phase. To do this, an external synchronizing signal could be simultaneously applied to the generator 21 and the generator 51. With the above initial conditions, that is, square wave generator 51 providing an output frequency $f_1$ with a period $T_1$ and a signal which is in phase with the signal provided by the triangular wave generator 21, whenever a positive pulse is supplied by generator 51 across the bridge 42, the circuit will conduct and provide the output DC signal which can either be positive or negative depending upon the value of Y times sin X. Thus, a device has been provided for generating an output signal equal to the product of a first variable and trigonometric function of a second variable.

As a typical example, the triangular wave generator and the square wave generator could provide an input signal at a frequency of approximately 10 kcs. and the X and Y input signals could vary at a rate of 100 cycles per second. By adjusting the repetitive frequency of the two generators 21 and 51, X and Y input signals of considerably greater frequencies could be utilized.

If it is desirable that a complete 360° coverage be obtained, that is where X would represent an angle between zero and 360°, instead of the zero to 180° obtained by filtering $f_1$, the band-pass filter 12 could be tuned to the second harmonic $f_2$, where $f_2$ equals $2f_1$.

Accordingly, it is desired that this invention not be limited solely to the filtering of the fundamental frequency, rather the concept of this invention is broader and includes filtering of other frequencies which are related to the fundamental frequency $f_1$. It is to be understood that the filter device 12 is neither a low pass nor a high pass filter but rather, accepts a narrow range of frequencies and, accordingly, should be considered a band-pass filter.

If it is desirable to provide a cosine multpilier or resolver, the device of FIG. 2 could be modified in the following manner: a DC bias, shown in FIG. 2 which corresponds to $\pi/2$ radians, can be applied through a switch 22 to the summer 20. the signal X and $\pi/2$ will sum to provide a signal equal to $X+\pi/2$. This signal will be provided to the modulator 10. Inasmuch as cosine X is equal to sine $(\pi/2+X)$, it can be observed that the output signal obtained from the filter 12 will represent cosine X rather than sine X. The output of detector 13 thus represents a signal $2Y/\pi$ cosine $(\pi X/T_1)$. The DC bias $\pi/2$ is determined from the scale factor assigned to the input signal. Additionally, the X input signal could be applied through an inverter to provide a signal equal to minus X. Therefore, a signal equal to $$\frac{\pi}{2^{\circ}}-X$$

will be provided to the pulse width modulator 10. Since cosine X is equal to $$\text{sine}\left(\frac{\pi}{2}-X\right)$$

it is therefore seen that the output signal obtained from the band-pass signal 12 will represent cosine X rather than sine X. The output of the detector 13 will represent a signal equal to $$\frac{2Y}{\pi} \text{cosine} \left(\frac{\pi X}{T_1}\right)$$

Furthermore, if an inverter were not used, a device such as 20 which would provide a subtraction between the DC bias signal and the input signal, could be utilized. This could be the common type subtractor utilized in servomechanism systems. If this were utilized, the DC bias and the output waveform from the triangular wave generator 21 could be summed prior to their application of the sum of their signals to the device 20.

While two particular embodiments of the invention have been illustrated, it will of course be understood that the invention is not limited thereto since various modifications may be made therein. For example, other trigonometric functions, such as the cosecant and the secant, could be obtained and it is contemplated by the appended claims to cover any such modifications as fall within the true spirit and scope of the invention. Furthermore, it is to be understood that it is not required that the pulse signal first be pulse width modulated. If desired, the pulse signal could be first amplitude modulated prior to pulse width modulating the pulse signal.

Additionally, if desired, the system shown in FIGS. 1 and 2 could be utilized as a device for obtaining the sine X or cosine X. This is accomplished by feeding the output signal from pulse width modulator 10 directly to the band-pass filter 12, thereby bypassing the amplitude modulator 11.

What I claim is new and desire to secure by Letters Patent is:

1. A system comprising in combination, means for providing a pulse width modulated intermediate signal whose width is related to a first signal, means for pulse amplitude modulating said intermediate signal in accordance with a second signal, means tuned to a fundamental frequency harmonic for band-pass filtering said pulse width and amplitude modulated intermediate signal to provide an output signal representative of the product of said second signal and a trigonometric function of said first signal and means for detecting the peak amplitude of said output signal to generate the product of said second signal and a trigonometric function of said first signal.

2. A system comprising in combination, means for providing a pulse width modulated intermediate signal whose width is related to a first signal, means for pulse amplitude modulating said intermediate signal in accordance with a second signal, means for bandpass filtering said pulse width and amplitude modulated intermediate signal to provide an output signal representative of the product of said second signal and a trigonometric function of said first signal, and means for detecting said band-pass filtered pulse width and amplitude modulated signal.

3. A system in accordance with claim 2 wherein said last means is a phase sensitive detector.

4. A trigonometric multiplier comprising means for pulse width modulating a signal A of a frequency $f$ in accordance with a first signal X, means for amplitude modulating said pulse width modulated signal in accordance with a second signal Y, means for band-pass filtering said pulse width and amplitude modulated signal A to provide an output signal representative of KY sine X where K is a constant and means for detecting the peak amplitude of said output signal to generate KY sine X.

5. A multiplier in accordance with claim 4 wherein said means for band-pass filtering is tuned to said frequency $f$.

6. A multiplier in accordance with claim 5 wherein said means for band-pass filtering is tuned to a multiple of said frequency $f$.

7. In combination, means for providing a pulse signal having a fundamental frequency and whose width is a function of a first signal, means for controlling the amplitude of said pulse signal as a function of a second signal, means tuned to the fundamental frequency for filtering said pulse signal to provide a signal representative of the product of said second signal and a trigonometric function of said first signal, and means for detecting the peak amplitude of said signal to generate the product of said second signal and a trigonometric function of said first signal.

8. A trigonometric multiplier comprising means for receiving a first input signal X, means for providing a constant voltage, means responsive to said signal X and said constant voltage for generating a signal Z equal to said constant voltage minus the signal X, means responsive to said signal Z for generating a pulse signal of a frequency whose pulse width is a function of the signal Z, means for receiving a second input signal Y, means responsive to said signal Y and said pulse width modulated signal for amplitude modulating said pulse width modulated signal, means for band-pass filtering said pulse width-pulse amplitude modulated signal to provide a signal representative of Y cos X and means for detecting the peak amplitude of said signal representative of Y cos X.

9. A multiplier in accordance with claim 8 wherein said means for band-pass filtering is tuned to said frequency $f$.

10. A multiplier in accordance with claim 8 wherein said means for band-pass filtering is tuned to an integral multiple K of the frequency $f$, where K is a constant integer.

References Cited

UNITED STATES PATENTS

| | | | |
|---|---|---|---|
| 3,017,109 | 1/1962 | Briggs | 235—194 |
| 3,057,555 | 10/1962 | Case | 235—194 |

FOREIGN PATENTS

| | | | |
|---|---|---|---|
| 627,109 | 8/1949 | Great Britain. | |

MALCOLM A. MORRISON, *Primary Examiner.*